Figure 1:
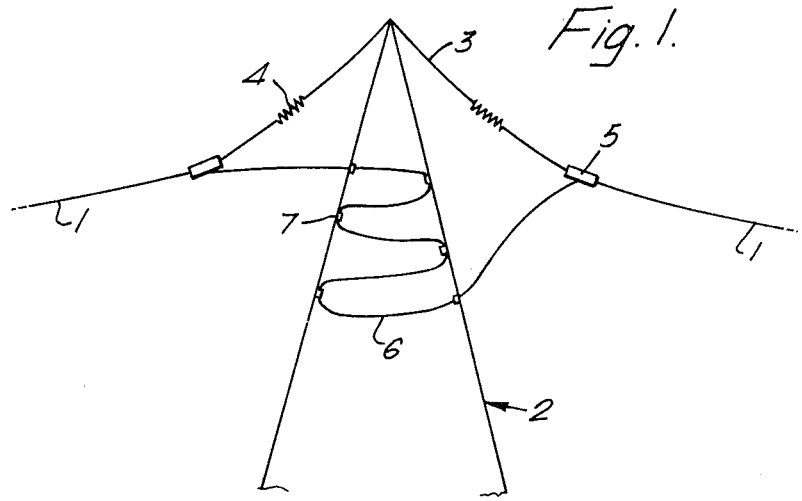

United States Patent [19]

Gaylard

[11] 4,409,429

[45] Oct. 11, 1983

[54] OVERHEAD ELECTRIC TRANSMISSION OR DISTRIBUTION SYSTEM

[76] Inventor: Bernard Gaylard, 2 Ollerbarrow Rd., Altrincham, Cheshire, England

[21] Appl. No.: 389,683

[22] Filed: Jun. 18, 1982

[30] Foreign Application Priority Data

Jun. 16, 1981 [GB] United Kingdom ............. 8118526

[51] Int. Cl.³ .................. H02G 7/04; H02G 7/20; H02G 7/22
[52] U.S. Cl. ............................. 174/43; 174/40 TD
[58] Field of Search ............ 174/40 R, 40 TD, 43, 174/45 R, 45 TD; 248/58, 64

[56] References Cited

U.S. PATENT DOCUMENTS

| 1,517,602 | 12/1924 | Trogner | 174/40 TD X |
| 1,662,245 | 3/1928 | Goodrich | 174/40 TD X |

FOREIGN PATENT DOCUMENTS

| 799112 | 3/1936 | France | 174/40 TD |
| 1598438 | 9/1981 | United Kingdom | 174/70 R |

Primary Examiner—Laramie E. Askin

Attorney, Agent, or Firm—Buell, Blenko, Ziesenheim & Beck

[57] ABSTRACT

Risk of fracture of an optical fibre in an overhead stranded electric conductor having an optical fibre loosely housed in an elongate compartment extending throughout the length of the conductor when the conductor is subjected to a tensile load greater than that which the optical fibre is designed to withstand is substantially reduced by supporting the stranded conductor from each of two opposite sides of a tower by suspension means incorporating a weak link designed to fracture at a tensile load less than that which the optical fibre can withstand before fracturing. An excess length of the stranded conductor extends between fittings at which the suspension means are secured to the conductor, is arranged sinuously down one side face of the tower and, where the stranded conductor is an earth conductor, is detachably secured to the tower at spaced positions along its length by releasable clips. When the tensile load on the stranded conductor increases to a value greater than that which the weak links can withstand, a weak link will fracture and the excess length of stranded conductor will be detached from the tower to reduce the load on the stranded conductor and thereby reduce risk of optical fibre fracture.

10 Claims, 2 Drawing Figures

OVERHEAD ELECTRIC TRANSMISSION OR DISTRIBUTION SYSTEM

This invention relates to an overhead electric transmission or distribution system in which at least one overhead stranded electric conductor is freely supported in long lengths from towers, pylons or other upstanding supports spaced along the system, all such supports, for convenience, hereinafter being included in the generic term "tower".

In the Complete Specification of British Pat. No. 1598438 there is described and claimed, for use in an overhead electric transmission or distribution system, an overhead stranded electric conductor which includes at least one optical waveguide for use in the communications field adapted for transmission of light and which comprises at least one layer of helically wound bare elongate elements of metal or metal alloy, at least one elongate compartment within and extending throughout the length of the stranded conductor and, loosely housed in the elongate compartment or at least one of the elongated compartments, at least one separate optical fibre and/or at least one optical bundle.

By the expression "optical bundle" is meant a group of optical fibres or a group of fibres including at least one optical fibre and including at least one non-optical reinforcing fibre or other reinforcing elongate member.

An overhead stranded electric conductor as described and claimed in the aforesaid patent will hereinafter be referred to as an "overhead stranded electric conductor of the kind described".

When an overhead stranded electric conductor of the kind described supported in an overhead electric transmission or distribution system vibrates, oscillates or is otherwise flexed, as may, for example, occur when the conductor is subjected to winds, by virtue of being housed loosely in the elongate compartment of the conductor, limited relative movement between the or each separate optical fibre and the stranded conductor and or between the or each optical bundle and the stranded conductor can take place, thereby substantially reducing the risk of optical fibre fracture. Limited relative movement between the or each separate optical fibre and the stranded conductor and/or between the or each optical bundle and the stranded conductor can also occur when the overhead stranded conductor is subjected to a change in tensile load during and after its installation due to forces imposed on it by winches and brakes, etc., which are used in tensioning the stranded conductor to obtain a predetermined sagging condition; after installation, changes in tensile load in the overhead stranded conductor can also occur due to changes in external loading and in temperature. Limited relative movement between the or each separate optical fibre and the stranded conductor and/or between the or each optical bundle and the stranded conductor can also occur whilst the overhead stranded conductor is in service and creep gives rise to non-elastic extension of the stranded conductor.

It is an object of the present invention to provide an improved overhead electric transmission or distribution system including at least one overhead stranded electric conductor of the kind described, wherein, in the event that the overhead stranded conductor is subjected to a tensile load greater than that which the or each optical fibre and/or optical bundle is designed to withstand, risk of optical fibre fracture is substantially reduced.

According to the invention, the improved overhead electric transmission or distribution system comprises at least one overhead stranded electric conductor of the kind described freely supported in long lengths from towers spaced along the system, wherein at at least one tower of the system the said overhead stranded conductor or one of the said overhead stranded conductors is supported from each of two opposite sides of the tower by suspension means incorporating a weak link designed to fracture at a tensile load substantially less than that which the or each optical fibre and/or optical bundle of the stranded conductor can withstand before fracturing and wherein an excess length of the said stranded conductor extends between the positions at which said suspension means are secured to the stranded conductor, the arrangement being such that, in the event that the tensile load on the stranded conductor increases to a value greater than that which the weak links can withstand, one or each of the weak links will fracture and the excess length of stranded conductor will reduce substantially the tensile load on the stranded conductor and thereby substantially reduce risk of optical fibre fracture.

Preferably, the suspension means by which the overhead stranded conductor is supported from two opposite sides of the tower each comprises a stranded wire rope having a weak link connected between, or to one of, its ends. Each weak link may be of any known form.

The excess length of stranded conductor at the tower is preferably arranged sinuously down one side face of the tower and, where the stranded conductor is an earth conductor, preferably is detachably secured to the tower at spaced positions along said excess length. Neighbouring parts of the sinuously extending excess length of stranded conductor may be connected together by, or the sinuously extending excess length of stranded conductor may be detachably secured to the tower at spaced positions along its length by, releasable clips which will disengage in the event that the tensile load on the stranded conductor increases to a value greater than that which the weak links can withstand.

The excess length of stranded conductor arranged sinuously down one side face of the tower may include a joint between two adjoining lengths of stranded conductor of the kind described.

Where the overhead stranded electric conductor of the kind described is an earth conductor, the suspension means incorporating a weak link on each side of the tower may be secured to the top of the tower. Where the overhead stranded electric conductor of the kind described is a live conductor, the suspension means incorporating a weak link on each side of the tower may be suspended from an electric insulator or electric insulator string mounted on or suspended from a cross-arm of the tower.

Figure 2:
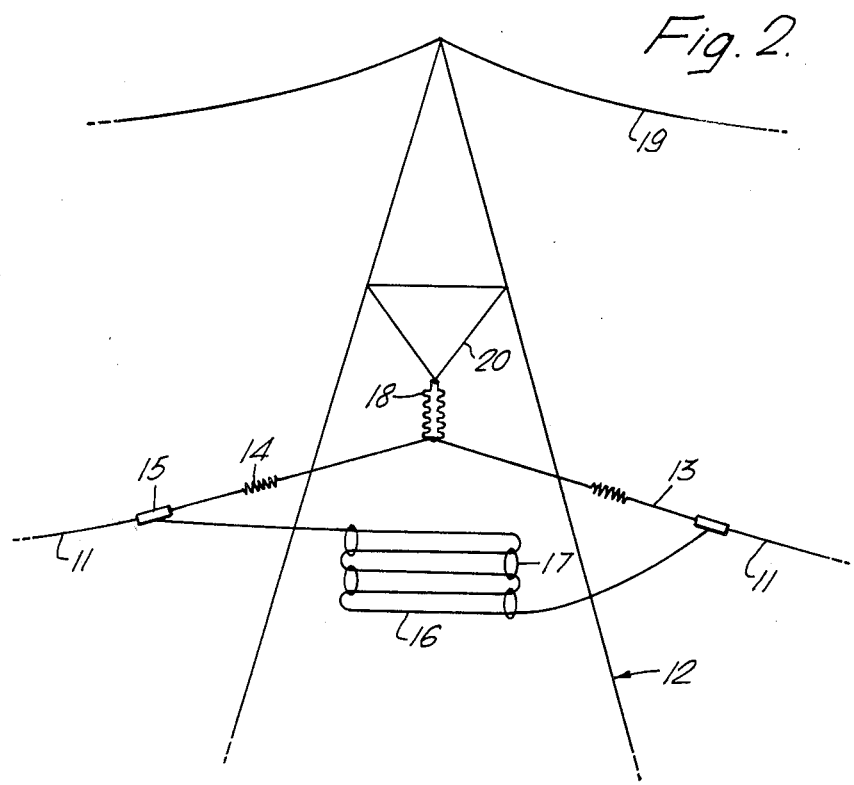

The invention is further illustrated by a description, by way of example, of two preferred forms of overhead electric transmission system with reference to the accompanying diagrammatic drawing, in which:

FIG. 1 is a fragmental representation of a tower of the first preferred form of overhead electric transmission system, and, FIG. 2 is a fragmental representation of a tower of the second preferred form of overhead electric transmission system.

In the overhead electric transmission system shown in FIG. 1, an overhead stranded electric conductor 1 of the kind described is an earth conductor and, on each of two opposite sides of the upper part of a tower 2, the stranded conductor is supported from the top of the tower by a stranded wire rope 3 which has a weak link 4 interconnected between its ends, one end of the wire rope being secured to the top of the tower and the other end of the wire rope being secured to the stranded conductor 1 by a wedge type fitting 5. An excess length 6 of the stranded conductor 1 extends between the wedge type fittings 5 and is arranged sinuously down one side face of the tower 2, the excess length being detachably secured to the tower at spaced positions along its length by releasable clips 7.

Each weak link 4 is designed to fracture at a tensile load substantially less than that which the or each optical fibre and/or optical bundle of the stranded conductor 1 can withstand before fracturing.

In the event that the tensile load of the stranded conductor 1 increases to a value greater than that which the weak links 4 can withstand, one or each of the weak links will fracture, the releasable clips 7 will disengage from the tower 2 and the excess length 6 of stranded conductor will reduce substantially the tensile load of the stranded conductor and will thereby substantially reduce risk of optical fibre fracture.

The second preferred form of overhead electric transmission system shown in FIG. 2 includes an earth conductor 19 suspended from the top of a tower 12 and at least one overhead stranded electric phase conductor 11 of the kind described which is freely supported from a cross arm 20 of the tower by an electric insulator 18 suspended from the cross arm. The stranded conductor 11 is supported from the lowermost end of the insulator 18 on each of two opposite sides of the tower 12 by a stranded wire rope 13 having a weak link 14 interconnected between its ends, one end of the wire rope being secured to the lowermost end of the insulator 18 and the other end of the wire rope being secured to the stranded conductor 1 by a wedge type fitting 15. An excess length 16 of the stranded conductor 11 extends between the wedge type fittings 15 and is arranged sinuously down and spaced transversely of the conductor from one side face of the tower, neighbouring parts of the sinuously extending excess length of stranded conductor being connected together by releasable clips 17. Each weak link 14 is designed to fracture at a tensile load substantially less than that which the or each optical fibre and/or optical bundle of the stranded conductor 11 can withstand before fracturing.

In the event that the tensile load on the stranded conductor 11 increases to a value greater than that which the weak links 14 can withstand, one or each of the weak links will fracture, the releasable clips 17 will disengage and the excess length of stranded conductor will reduce substantially the tensile load on the stranded conductor and will thereby substantially reduce risk of optical fibre fracture.

What I claim as my invention is:

1. An overhead electric transmission or distribution system comprising at least one overhead stranded electric conductor comprising at least one layer of helically wound bare elongate elements of metal or metal alloy, at least one elongate compartment within and extending throughout the length of the stranded conductor and, loosely housed in the elongate compartment or at least one of the elongate compartments, at least one optical fibre, which overhead stranded conductor is freely supported in long lengths from towers spaced along the system, wherein at at least one tower of the system at least one said overhead stranded conductor is supported from each of two opposite sides of the tower by suspension means incorporating a weak link designed to fracture at a tensile load substantially less than that which the or each optical fibre of the stranded conductor can withstand before fracturing and wherein an excess length of the said stranded conductor extends between the positions at which said suspension means are secured to the stranded conductor, the arrangement being such that, in the event that the tensile load on the stranded conductor increases to a value greater than that which the weak links can withstand, at least one of the weak links will fracture and the excess length of stranded conductor will reduce substantially the tensile load on the stranded conductor and thereby substantially reduce risk of optical fibre fracture.

2. An overhead electric transmission or distribution system as claimed in claim 1, wherein the suspension means by which the overhead stranded conductor is supported from two opposite sides of the tower each comprises a stranded wire rope having a weak link connected between, or to one of, its ends.

3. An overhead electric transmission or distribution system as claimed in claim 1, wherein the excess length of stranded conductor at the tower is arranged sinuously down one side face of the tower.

4. An overhead electric transmission or distribution system as claimed in claim 3 in which the stranded conductor is an earth conductor, wherein the excess length of stranded conductor is detachably secured to the tower at spaced positions along said excess length.

5. An overhead electric transmission or distribution system as claimed in claim 4, wherein the sinuously extending excess length of stranded conductor is detachably secured to the tower at spaced positions along its length by releasable clips which will disengage in the event that the tensile load on the stranded conductor increases to a value greater than that which the weak links can withstand.

6. An overhead electric transmission or distribution system as claimed in claim 1, in which the stranded conductor is a live conductor, wherein the suspension means incorporating a weak link on each side of the tower is suspended from an electric insulator mounted on or suspended from a cross-arm of the tower.

7. An overhead electric transmission or distribution system as claimed in claim 6, wherein the excess length of stranded conductor at the tower is arranged sinuously down and spaced transversely of the conductor from one side face of the tower.

8. An overhead electric transmission or distribution system as claimed in claim 7, wherein neighbouring parts of the sinuously extending excess length of stranded conductor are connected together by releasable clips which will disengage in the event that the tensile load on the stranded conductor increases to a value greater than that which the weak links can withstand.

9. An overhead electric transmission or distribution system as claimed in any one of claims 3 to 8, wherein the excess length of stranded conductor arranged sinuously down one side face of the tower includes a joint between two adjoining lengths of said stranded conductor.

10. An overhead transmission or distribution system as claimed in any one of claims 1 to 3 in which the stranded conductor is an earth conductor, wherein the suspension means incorporating a weak link on each side of the tower is secured to the top of the tower.

* * * * *

UNITED STATES PATENT AND TRADEMARK OFFICE
CERTIFICATE OF CORRECTION

PATENT NO. : 4,409,429
DATED : October 11, 1983
INVENTOR(S) : Bernard Gaylard

It is certified that error appears in the above-identified patent and that said Letters Patent is hereby corrected as shown below:

Claim 10, column 4, line 63, after "overhead", --electric-- should be inserted.

Signed and Sealed this

Twentieth Day of December 1983

[SEAL]

Attest:

GERALD J. MOSSINGHOFF

Attesting Officer

Commissioner of Patents and Trademarks